June 16, 1953  J. M. JOHNSON  2,642,262
VALVE

Filed April 26, 1948  2 Sheets-Sheet 1

INVENTOR.
Joe M. Johnson
BY
Wayland D. Keith
HIS AGENT

June 16, 1953  J. M. JOHNSON  2,642,262
VALVE
Filed April 26, 1948  2 Sheets-Sheet 2
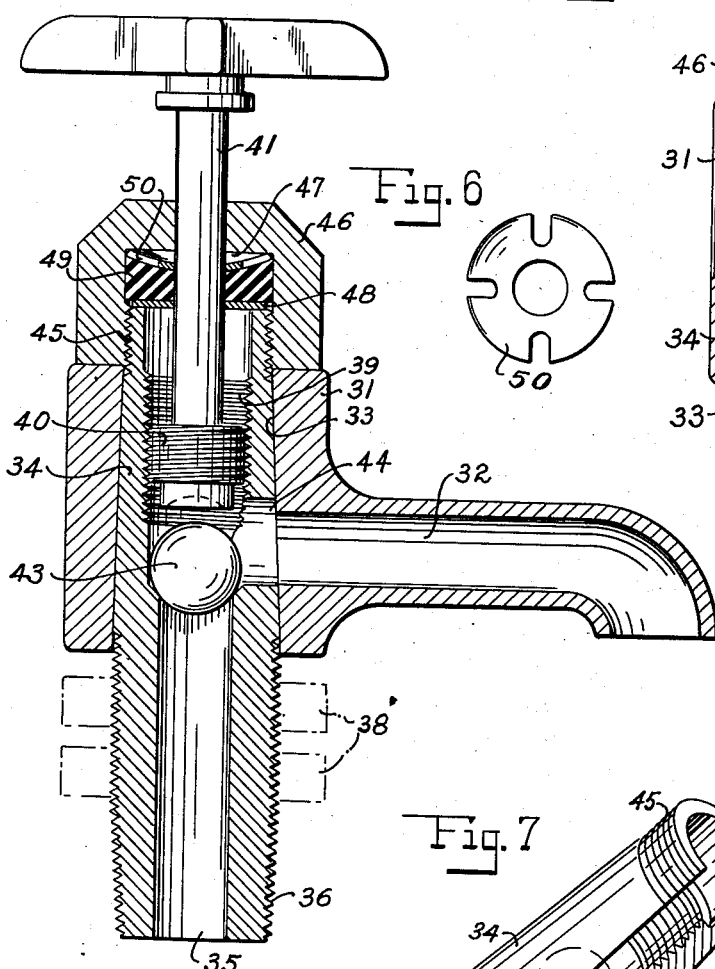
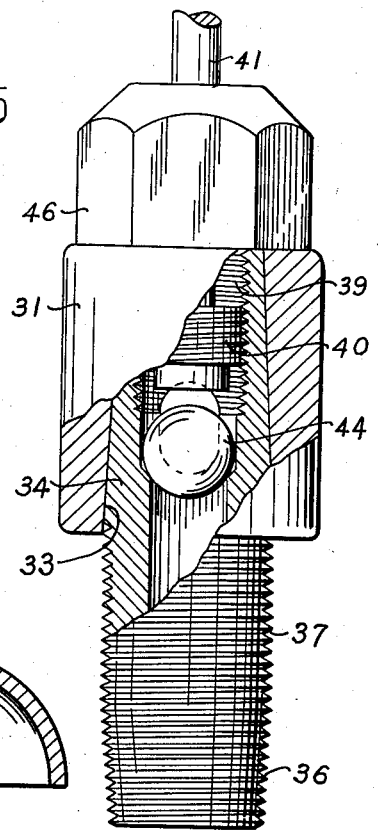
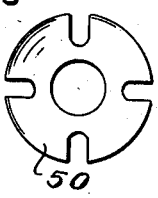
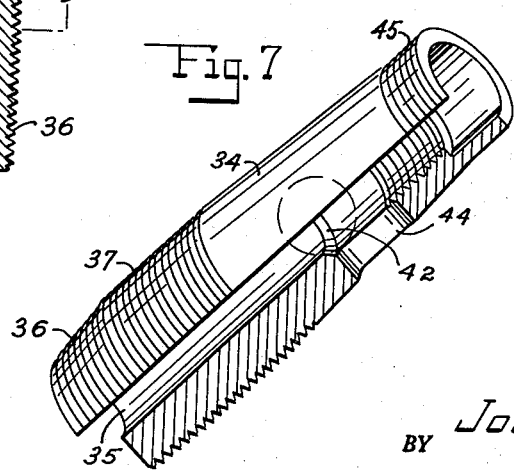
INVENTOR.
Joe M. Johnson
BY
Wayland D. Keith
HIS AGENT Patented June 16, 1953

2,642,262

UNITED STATES PATENT OFFICE 2,642,262

VALVE

Joe M. Johnson, near Iowa Park, Tex.

Application April 26, 1948, Serial No. 23,331

2 Claims. (Cl. 251—139)

This invention relates to improvements in valves and more particularly to ball type valves utilizing removable seats. Various valves, both ball type and valves with removable seats, have been proposed heretofore, but these for the most part were complicated in construction, expensive to manufacture, and inadequate from a utility standpoint, requiring considerable attention and repair.

The present invention has been designed in an effort to overcome the objections of the valves heretofore and produce a valve that is simple in construction, easy to manufacture from a production standpoint, and having wearing qualities so as to obviate repairs and upkeep incidental to valves of this type.

The primary object of this invention is to provide a valve that is adapted to wear over a long period of time without requiring the usual attention of grinding the seats or of replacing these at frequent intervals.

Another object of this invention is to provide a valve in which the valve body has a removable core member, which may be removed, renewed, or repaired in a very short time without requiring special tools or without the necessity of removing the valve from the pipe line.

Another object of this invention is to provide a valve that is simple in construction, low in cost, and easy to maintain.

The invention illustrated in the accompanying drawings shows a preferred embodiment, together with a modification thereof; in which:

Fig. 4 is a vertical sectional view of this valve, with parts shown in elevation, of the modified form of the device;

Fig. 5 is an elevational view of the modified form of the valve with parts broken away to show the details of construction;

Fig. 6 is a concave-convex spring member; and

Fig. 7 is a perspective view of the removable core or seat member of the modified form of the valve with parts broken away and showing the relative position of the ball member in dash-outline.

Figure 1:
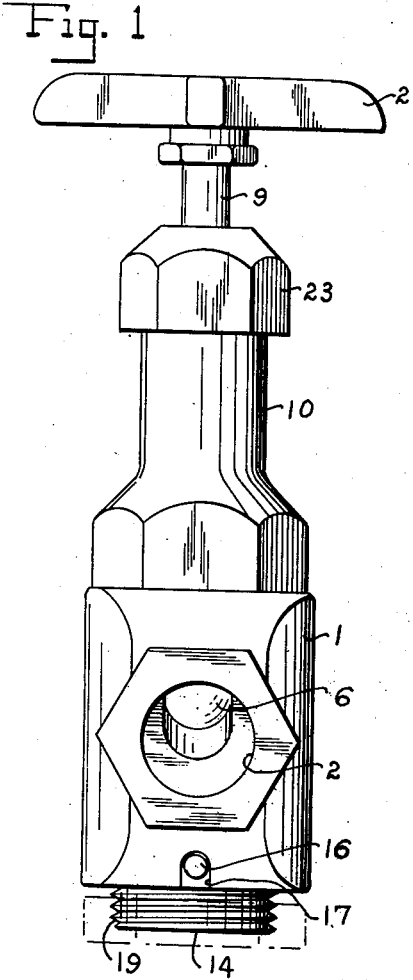
Fig. 1 is an elevational view of the preferred embodiment of the device.
Figure 2:
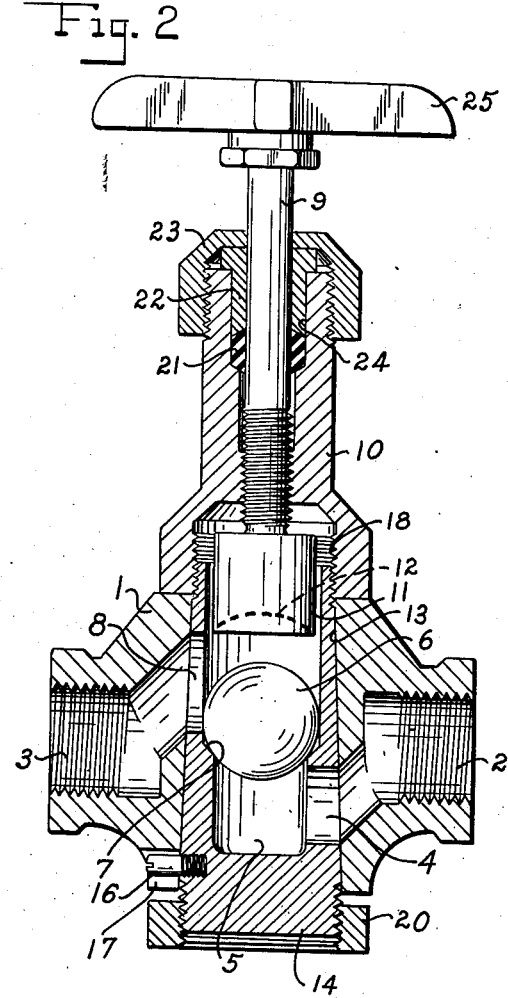
Fig. 2 is a sectional view taken on line 2—2 of Fig. 1, looking in the direction indicated by the arrows.
Figure 3:
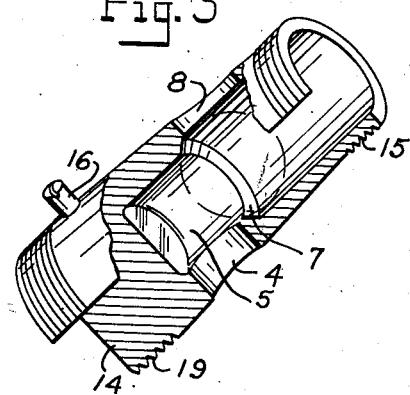
Fig. 3 is a perspective view of the removable core or seat member with parts broken away and showing the relative position of the ball member in dash-outline.

With more detailed reference to the drawings, the numeral 1 designates a valve body having a threaded inlet 2 and a threaded outlet 3 for passage of a fluid therethrough, in the directions indicated by the arrow. The inlet opening 2 connects with a passage 4 to direct the fluid into axial opening 5 beneath ball valve member 6, as will best be seen in Fig. 2. The ball valve member 6 is adapted to seat upon a shouldered valve seat 7 under the normal weight of ball 6, and for all practical purposes the ball 6 may serve as a check valve to admit the unimpeded flow of fluid through the valve member in one direction. As the fluid flows upward through axial opening 5 to left ball 6, the fluid will pass out through slotted opening 8 into outlet opening 3.

By having the opening 8 slotted, the ball 6 will be prevented from sealing the opening upon the raising of ball 6 under the influence of pressure exerted by the fluid passing upward through the axial opening 5. Provision is made for positively closing the ball valve member 6 by the provision of a valve stem 9 threadably engaging bonnet 10. The lower end of the valve stem 9 has a boss 11 thereon, which boss has a concave recess 12 therein adapted to engage with the top of ball 6. Upon turning of valve stem 9, the screw will force boss 11 into engagement with ball 6, and the ball 6 will seat upon seat 7 to prevent passage of fluid in either direction.

The valve body 1 has a tapered opening 13 therein arranged transversely of the inlet-outlet openings 2—3. The tapered opening 13 is adapted to receive a complementary tapered plug 14, so that the openings 4 and 8 of the plug 14 will register with the inlet-outlet openings 2—3 when the tapered plug 14 is in fitting relation with tapered transverse bore 13. The tapered plug 14 has an axial opening 5 therein extending to a point to intersect openings 4 and 8. The upper end of plug 14 is threaded at 15 to a point below the upper shoulder of valve body 1, so that upon screwing bonnet 10 into place, the tapered plug will be drawn into fluid tight fitting relation with the transverse tapered bore 13 in valve body 1.

A screw 16 is threaded into a side of tapered plug 14 and protrudes outwardly therefrom, which protruding screw portion is adapted to register with a notch 17 formed in the lower side of body 1. When the screw 16 and the notch 17 are in interengagement the holes 2 and 4, and 3 and 8 respectively are adapted to register, so as not to require aligning work to bring these passages into register. The screw 16 is so positioned that when the tapered plug 14 is drawn securely into place by the threaded portion 18 of bonnet 10, that the screw 16 will not engage the upper portion of slot 17.

The lower end of tapered plug 16 is threaded at 19 to enable nut 20 to be screwed thereon until the nut is in abutting relation with the lower face of valve body 1, and with the bonnet nut 18 loosened, the plug 14 may be readily removed by screwing the nut upward against the lower face of valve body 1, which draws plug 14 downward.

The bonnet 10 is provided with packing 21, a packing gland 22, and a gland nut 23, so as to insure a tight sealing relation of the annular space 24 formed around the valve stem 9. The valve stem may be provided with the usual hand wheel 25 for operating same.

The modified form of the device is shown in form of an angle cock having a body 31 which has a lateral spigot 32. The body 31 has a tapered axial bore 33 which is adapted to complementarily receive tapered plug 34. The tapered plug 34 has an axial opening 35 passing therethrough, the lower end of which forms a fluid inlet and has a tapered pipe thread 36 at the lower end thereof, and a straight thread 37 adapted to receive nuts 38 from a point at the upper end of the pipe thread 36 to a point extending into the lower portion of valve body 31. The bore 35 at the upper end has threads 39 which are adapted to receive the lower threaded end 40 of valve stem 41. Intermediate the threaded portion 39 and the inlet opening at the lower end thereof is a valve seat 42 upon which a ball valve member 43 is adapted to seat.

A slotted opening 44 is provided within a side of tapered plug 34, which tapered plug extends laterally therefrom to register with the opening within spigot 32. The slotted opening is provided to prevent the ball 43 from closing the opening when fluid is flowing therethrough as indicated by the arrow in Fig. 4.

The upper end of tapered plug 34 is threaded at 45 to receive a nut 46. The nut 46 has an axial bore 47 adapted to receive a packing retaining washer 48, packing 49, and a concave-convex spring member 50, in order to insure constant spring pressure upon packing 49 when nut 46 is screwed into place, as indicated in Fig. 4.

Upon the interengaging of threaded nut 46 with threads 45 and with the nut screwed against the upper face of valve body 31, the tapered plug 34 is drawn into tight fitting relation within the tapered axial bore 33 of the valve body 31. Sufficient resiliency is provided by concave-convex spring member 50 to draw the tapered plug 34 into place and exert the correct tension on packing 49.

Normally a valve of this type is used for wash bowls and lavatories and is provided with nuts 38 threadably engaging straight threaded position pipe 37. It is the usual practice to place one nut above and one nut below the metal portion of the wash bowl to which the valve is attached; however should repairs or attention be needed, the valve can be disassembled without removing the valve from the line, merely by removing the nut 46, stem 9, and if it is necessary to remove the body 31 from the tapered plug 34, it is only necessary to screw the nut 38 into abutting relation with the lower face of valve body 31 until the nut pushes the body portion 31 upward, so as to loosen it from tapered plug 34.

It will be appreciated that, upon loosening the valve stem 41 off of ball 43, the pressure beneath the ball 43 will cause the ball to rise upward so as to permit the flow of fluid outward through the spigot, as indicated by the arrow in Fig. 4. By constructing the stem 9 with an enlarged threaded portion 40 on the lower end thereof, very little, if any, leakage will pass upward through the threaded portion 40; however in the event leakage does occur, the packing 49 will prevent the valve from leaking.

Having thus described my invention, I claim:

1. In a valve of the character described, a valve body having a tapered bore therein which bore converges toward the upper end of said body, a lateral opening formed in said body in position to intersect said tapered bore, a plug fitted within said bore and being tapered complementarily therewith, which plug has a hollow formed therein, the smaller end of said tapered plug being externally threaded and extending upwardly above said body, an inlet opening and an outlet opening formed in said tapered plug and being in communication with said hollow portion of said plug, with at least one of said openings arranged complementary with said lateral opening in said valve body, a valve seat formed within said plug intermediate said inlet and said outlet openings, a valve member positioned within said hollow portion in said tapered plug to seat upon said valve seat, a valve stem mounted in said tapered plug for urging said valve into engagement with said valve seat for positively closing said valve, an internally threaded valve bonnet threadably engaging said threaded smaller end of said tapered plug for drawing said tapered plug into binding engagement with said tapered bore of said valve body so as to form a fluid tight joint therebetween and between said plug and said bonnet, said bonnet having a packing element therein and surrounding said stem so as to form a fluid tight joint between said stem and said bonnet, and threads formed on the larger end portion of said hollow, tapered plug and extending therealong to a point within said bore of said valve body so a threaded nut, engageable with said threads and the lower face of said valve body, will withdraw said tapered plug from said bore upon urging said nut against the lower face of said body.

2. In a valve of the character described, a valve body having a tapered bore therein which bore converges toward the upper end of said body, a lateral opening formed in said body in position to intersect said tapered bore, a plug fitted within said bore and being tapered complementarily therewith, which plug has a hollow formed therein, the smaller end of said tapered plug being exteriorly threaded and extending upwardly above said body, an inlet opening and an outlet opening formed in said tapered plug and being in communication with said hollow portion thereof, with at least one of said openings arranged complementary with said lateral opening in said valve body, a valve seat formed within said plug intermediate said inlet opening and said outlet opening, a valve member positioned within said hollow portion in said tapered plug to seat upon said valve seat, a valve stem mounted in said tapered plug for urging said valve into engagement with said valve seat for positively closing said valve, an internally threaded valve bonnet threadably engaging said threaded smaller end portion of said tapered plug for drawing said tapered plug into binding engagement with said tapered bore of said valve body so as to form a fluid tight joint therebetween said plug and said bonnet, said bonnet having a packing element therein and surrounding said stem and compressible between said bonnet and said plug upon tightening of said bonnet on said plug so as to form a fluid tight joint between said stem, and said bonnet and threads formed on the larger end of said hollow, tapered plug and extending therealong to a point within said bore of said valve body so a threaded nut engageable with said threads and the lower face of said valve body will withdraw said tapered plug from said bore upon urging said nut against the lower face of said body.

JOE M. JOHNSON.

References Cited in the file of this patent

UNITED STATES PATENTS

| Number | Name | Date |
|---|---|---|
| 470,058 | Kiser | Mar. 1, 1892 |
| 660,193 | Loetzer | Oct. 23, 1900 |
| 859,145 | Stephenson | July 2, 1907 |
| 919,753 | Ord | Apr. 27, 1909 |
| 982,108 | Wilkinson | Jan. 17, 1911 |
| 1,005,523 | Dunlap | Oct. 10, 1911 |
| 1,149,594 | O'Malley | Aug. 10, 1915 |
| 1,642,724 | Fleming | Sept. 20, 1927 |
| 1,890,357 | Barber | Dec. 6, 1932 |
| 1,908,440 | Milton | May 9, 1933 |
| 1,982,514 | Hansen | Nov. 27, 1934 |